United States Patent
Gregor et al.

(10) Patent No.: US 9,200,754 B2
(45) Date of Patent: Dec. 1, 2015

(54) N-CHANNEL FLOW RATIO CONTROLLER CALIBRATION

(71) Applicants: Mariusch Gregor, Gilroy, CA (US); John W. Lane, San Jose, CA (US)

(72) Inventors: Mariusch Gregor, Gilroy, CA (US); John W. Lane, San Jose, CA (US)

(73) Assignee: APPLIED MATERIALS, INC., Santa Clara, CA (US)

(*) Notice: Subject to any disclaimer, the term of this patent is extended or adjusted under 35 U.S.C. 154(b) by 423 days.

(21) Appl. No.: 13/846,007

(22) Filed: Mar. 18, 2013

(65) Prior Publication Data
US 2013/0233401 A1   Sep. 12, 2013

Related U.S. Application Data

(63) Continuation of application No. 12/986,012, filed on Jan. 6, 2011, now Pat. No. 8,397,739.

(60) Provisional application No. 61/293,545, filed on Jan. 8, 2010.

(51) Int. Cl.
*F16K 31/02* (2006.01)
*F17D 3/00* (2006.01)
*G01F 25/00* (2006.01)

(52) U.S. Cl.
CPC .............. *F17D 3/00* (2013.01); *G01F 25/003* (2013.01); *G01F 25/0053* (2013.01); *Y10T 137/0324* (2015.04); *Y10T 137/0363* (2015.04); *Y10T 137/0379* (2015.04); *Y10T 137/0402* (2015.04); *Y10T 137/2524* (2015.04); *Y10T 137/2529* (2015.04)

(58) Field of Classification Search
CPC ...... F17D 3/00; G01F 25/003; G01F 25/0053; Y10T 137/0402; Y10T 137/0324; Y10T 137/2524; Y10T 137/2529; Y10T 137/0363; Y10T 137/0379; Y10T 137/7759; Y10T 137/7761
USPC ......... 137/2, 9, 12, 101, 101.19, 118.01, 486, 137/487.5; 73/1.01, 1.07; 702/100; 118/719; 216/59
See application file for complete search history.

(56) References Cited

U.S. PATENT DOCUMENTS 4,494,399 A * 1/1985 Youngman ..................... 73/1.07
5,567,885 A   10/1996 Garside
5,901,741 A   5/1999 Mudd et al.
6,333,272 B1 * 12/2001 McMillin et al. ............. 438/710

(Continued)

OTHER PUBLICATIONS

International Search Report and Written Opinion dated Sep. 23, 2011, for International Application No. PCT/US2011/020316.

*Primary Examiner* — Minh Le
(74) *Attorney, Agent, or Firm* — Patterson & Sheridan, LLP (57) ABSTRACT

Embodiments of the present invention generally relate to methods of controlling gas flow in etching chambers. The methods generally include splitting a single process gas supply source into multiple inputs of separate process chambers, such that each chamber processes substrates under uniform processing conditions. The method generally includes using a mass flow controller as a reference for calibrating a flow ratio controller. A span correction factor may be determined to account for the difference between the actual flow and the measured flow through the flow ratio controller. The span correction factors may be used to determine corrected set points for each channel of the flow controller using equations provided herein. Furthermore, the set points of the flow ratio controller may be made gas-independent using additional equations provided herein.

17 Claims, 5 Drawing Sheets

(56) References Cited

U.S. PATENT DOCUMENTS

| | | | |
|---|---|---|---|
| 6,363,958 B1* | 4/2002 | Ollivier | 137/2 |
| 6,843,882 B2* | 1/2005 | Janakiraman et al. | 156/345.29 |
| 7,072,743 B2* | 7/2006 | Shajii et al. | 700/282 |
| 7,822,570 B2* | 10/2010 | Shareef et al. | 702/100 |
| 8,131,400 B2* | 3/2012 | Smirnov | 700/282 |
| 8,282,983 B1* | 10/2012 | Kapoor et al. | 427/8 |
| 8,397,739 B2* | 3/2013 | Gregor et al. | 137/2 |
| 2002/0179148 A1 | 12/2002 | Lull et al. | |
| 2003/0005958 A1 | 1/2003 | Rocha-Alvarez et al. | |
| 2008/0195332 A1* | 8/2008 | Wong et al. | 702/45 |
| 2009/0004874 A1 | 1/2009 | Sant | |
| 2009/0206056 A1 | 8/2009 | Xu et al. | |
| 2011/0265951 A1* | 11/2011 | Xu et al. | 156/345.26 |
| 2011/0277847 A1 | 11/2011 | Sawusch | |
| 2012/0174990 A1* | 7/2012 | Yasuda | 137/101 |

* cited by examiner

N-CHANNEL FLOW RATIO CONTROLLER CALIBRATION

CROSS-REFERENCE TO RELATED APPLICATIONS

This application is a continuation of U.S. patent application Ser. No. 12/986,012, filed Jan. 6, 2011, which claims benefit of U.S. Provisional Patent Application Ser. No. 61/293,545, filed Jan. 8, 2010, both of which are herein incorporated by reference.

BACKGROUND OF THE INVENTION

1. Field of the Invention

Embodiments disclosed herein generally relate to processing a substrate in an etch chamber.

2. Description of the Related Art

A chip manufacturing facility is composed of a broad spectrum of technologies. Cassettes containing semiconductor substrates are routed to various stations in a facility where they may be processed or inspected. Semiconductor processing generally involves the deposition of material onto and removal of material from substrates. Typical processes include chemical vapor deposition (CVD), physical vapor deposition (PVD), electroplating, chemical mechanical planarization (CMP), etching, and others.

One concern regarding substrate processing is substrate throughput. Generally, the greater the substrate throughput, the lower the manufacturing cost and therefore the lower the cost of the processed substrates. In order to increase substrate processing throughput, batch processing chambers have been developed. Batch processing allows several substrates to be processed simultaneously using common fluids (such as process gases), chambers, processes, and the like, thereby decreasing equipment costs and increasing throughput. Ideally, batch-processing systems expose each of the substrates to an identical process environment whereby each substrate simultaneously receives the same process gases and plasma densities for uniform processing of the batch. Unfortunately, the processing within batch processing systems is hard to control such that uniform processing occurs with respect to every substrate. Consequently, batch processing systems are notorious for non-uniform processing of substrates. To achieve better process control, single chamber substrate processing systems were developed to conduct substrate processing on a single substrate in a one-at-a-time-type fashion within an isolated process environment. Unfortunately, single chamber substrate processing systems generally are not able to provide as high a throughput rate as batch processing systems, as each substrate must be sequentially processed.

Therefore, there is a need for a substrate processing system configured to provide controllable etch uniformity of a single substrate system and improved throughput characteristics of a batch processing system.

SUMMARY OF THE INVENTION

Embodiments of the present invention generally relate to methods of controlling gas flow in etching chambers. The methods generally include splitting a single process gas supply source into multiple inputs to separate process chambers, such that each chamber processes substrates under uniform processing conditions. The method generally includes using a mass flow controller as a reference for calibrating a flow ratio controller. A span correction factor may be determined to account for the difference between the actual flow and the measured flow through the flow ratio controller. The span correction factors may be used to determine corrected set points for each channel of the flow controller using equations provided herein. Furthermore, the set points of the flow ratio controller may be made gas-independent using additional equations provided herein.

In one embodiment, a method of calibrating a flow ratio controller for a tandem etching chamber includes setting a first channel of a flow ratio controller coupled to the process gas supply to a 100 percent set point. All remaining channels of the flow ratio controller are set to a zero percent set point, and all downstream isolation valves for the remaining channels of the flow ratio controller that are set at the zero percent set point are closed. The flow of a mass flow controller is set equal to the flow of the 100 percent set point of the first channel. The flow of a process gas through the flow ratio controller is allowed to stabilize, and a span correction factor for the flow of the process gas through the first channel of the flow ratio controller is calculated. Repeating similar steps, a span correction factor for the flow of the process gas through the remaining channels of the flow ratio controller is calculated. A corrected set point for each channel of the flow ratio controller is then calculated.

In another embodiment, a method of calibrating a flow ratio controller for a tandem etching chamber includes determining a span correction factor for a first channel of the flow ratio controller, which comprises setting the first channel of the flow ratio controller coupled to the process gas supply to a 100 percent set point. All remaining channels of the flow ratio controller are set to a zero percent set point, and all downstream isolation valves for the remaining channels of the flow ratio controller that are set at the zero percent set point are closed. The flow of a mass flow controller is set equal to the flow of the 100 percent set point of the first channel. The flow of a process gas through the first channel of the flow ratio controller is allowed to stabilize, and the flow of the process gas through the first channel of the flow ratio controller is measured for at least about 10 evenly-spaced time intervals. A span correction factor is calculated for the flow of the process gas through the first channel of the flow ratio controller. The span correction factors for the remaining channels of the flow ratio controller are calculated, and the corrected set points for each channel of the flow ratio controller are determined using the equation:

$$cSP_i = \frac{SP_i}{CF_i} * \left(\sum_i^n \frac{SP_i}{CF_i}\right)^{-1}.$$

In another embodiment, a method of calibrating a flow ratio controller for a tandem etching chamber includes splitting a process gas supply into four gas supply lines. A first gas line and second gas line are coupled to a first process chamber, and a third gas line and fourth gas line are coupled to a second process chamber. Each gas line is coupled to a distinct channel of a flow ratio controller. A corrected set point for the first, second, third, and fourth channels of the flow ratio controller are determined using the equation:

$$cSP_i = \frac{SP_i}{CF_i} * \left(\sum_i^n \frac{SP_i}{CF_i}\right)^{-1}.$$

Gas-independent precision correction factors for the first, second, third, and fourth channels of the flow ratio controller are determined using the equations:

$$PCF_1 = \frac{4}{1 + \frac{1}{CF_1}(CF_2 + CF_3 + CF_4)}$$

$$PCF_2 = \frac{4}{1 + \frac{1}{CF_2}(CF_1 + CF_3 + CF_4)}$$

$$PCF_3 = \frac{4}{1 + \frac{1}{CF_3}(CF_1 + CF_2 + CF_4)}$$

$$PCF_4 = \frac{4}{1 + \frac{1}{CF_4}(CF_1 + CF_2 + CF_3)}.$$

Set points for the first, second, third, and fourth channels of the flow ratio controller are recalculated using the gas-independent precision correction factors and the equation:

$$cSP_i = \frac{SP_i}{PCF_i} * \left(\sum_i^n \frac{SP_i}{PCF_i}\right)^{-1}.$$

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present invention generally relate to methods of controlling gas flow in etching chambers. The methods generally include splitting a single process gas supply source into multiple inputs of separate process chambers, such that each chamber processes substrates under uniform processing conditions. The method generally includes using a mass flow controller as a reference for calibrating a flow ratio controller. A span correction factor may be determined to account for the difference between the actual flow and the measured flow through the flow ratio controller. The span correction factors may be used to determine corrected set points for each channel of the flow controller using equations provided herein. Furthermore, the set points of the flow ratio controller may be made gas-independent using additional equations provided herein.

Embodiments discussed herein may be practiced in any tandem chamber substrate processing system. For example, embodiments disclosed herein may be practiced in the PRODUCER® Etch processing chamber available from Applied Materials, Inc., Santa Clara, Calif. It is to be understood that the embodiments discussed herein may be practiced in other processing systems, including those sold by other manufacturers.

Figure 1:
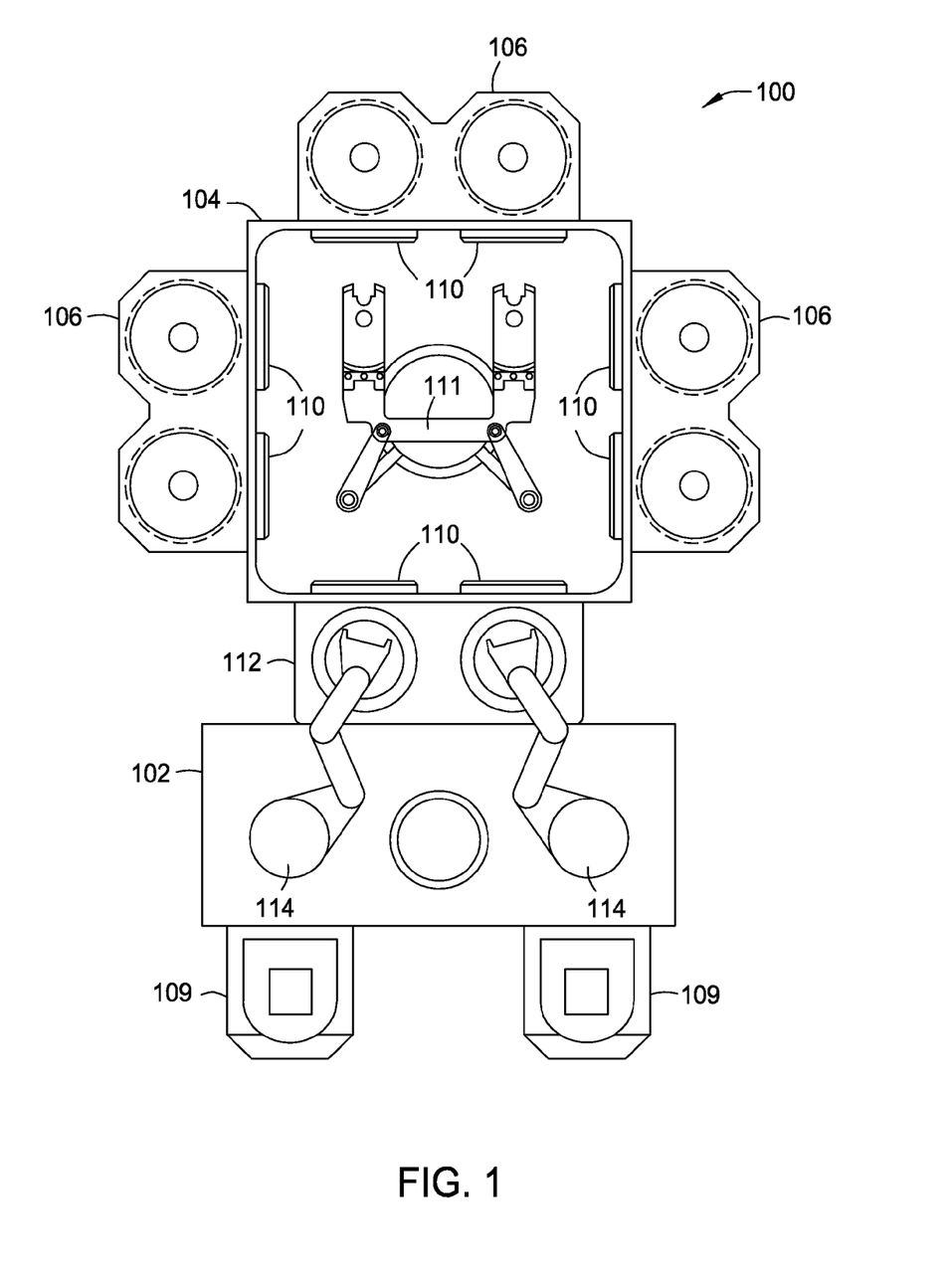
FIG. 1 is a schematic of a tandem chamber etch system.

FIG. 1 illustrates a plan view of a tandem chamber etch system 100 in which the embodiments may practiced. The system 100 is generally a self-contained system having processing utilities supported on a mainframe structure that can be easily installed and provides a quick start up for operation. System 100 generally includes four different regions, namely, a front-end staging area 102, a load lock chamber 112, and a transfer chamber 104 in communication with a plurality of tandem processing chambers 106 through isolation valves 110. Front-end staging area 102, which is generally known as a factory interface or mini environment, generally includes an enclosure having at least one substrate containing cassette 109 positioned in communication therewith via a pod loader. The system 100 may also include a pair of front-end substrate transfer robots 114 which may generally be single-arm robots configured to move substrates between the front-end staging area 102 and the load lock chamber 112. The pair of front-end substrate transfer robots 114 are generally positioned proximate cassettes 109 and are configured to remove substrates therefrom for processing, as well as position substrates therein once processing of the substrates is complete.

Although two cassettes 109 are shown, the system 100 is not limited to any particular number of cassettes 109. For example, the system 100 may utilize a stackable substrate cassette feeder assembly (not shown). The stackable substrate feeder assembly may be configured to store a plurality of cassettes 109 in a vertical stack and individually deliver the cassettes 109 to outer cassette locations/pod loaders when needed. The front-end staging area 102 is selectively in communication with the load lock chamber 112 through, for example, a selectively actuated valve (not shown). Additionally, load lock chamber 112 may also be selectively in communication with the transfer chamber 104 via another selectively actuated valve. Therefore, the load lock chamber 112 may operate to isolate the interior of the substrate transfer chamber 104 from the interior of the front-end enclosure 102 during the process of transferring one or more substrates into the transfer chamber 104 for processing. The load lock chamber 112 may be a side-by-side substrate type chamber, a single substrate type chamber, or multi-substrate type load lock chamber.

As illustrated in FIG. 1, a substrate transfer robot 111 may be centrally positioned in the interior portion of the transfer chamber 104. The substrate transfer robot 111 is generally configured to receive substrates from the load lock chamber 112 and transport the substrates received therefrom to one of the tandem processing chambers 106 positioned about the perimeter of the transfer chamber 104. Additionally, the substrate transfer robot 111 is generally configured to transport substrates between the respective tandem processing chambers 106, as well as from the tandem processing chambers 106 back into the load lock chamber 112. The substrate transfer robot 111 generally includes an end effector configured to support two substrates thereon simultaneously. The end effector may include two support surfaces generally aligned in a single plane to hold the substrates thereon. Additionally, the end effector of the substrate transfer robot 111 is selectively extendable, while the base is rotatable, which may allow the end effector access to the interior portion of any of the tandem processing chambers 106, the load lock chamber 112, and/or any other chamber positioned around the perimeter of the transfer chamber 104.

Figure 2:
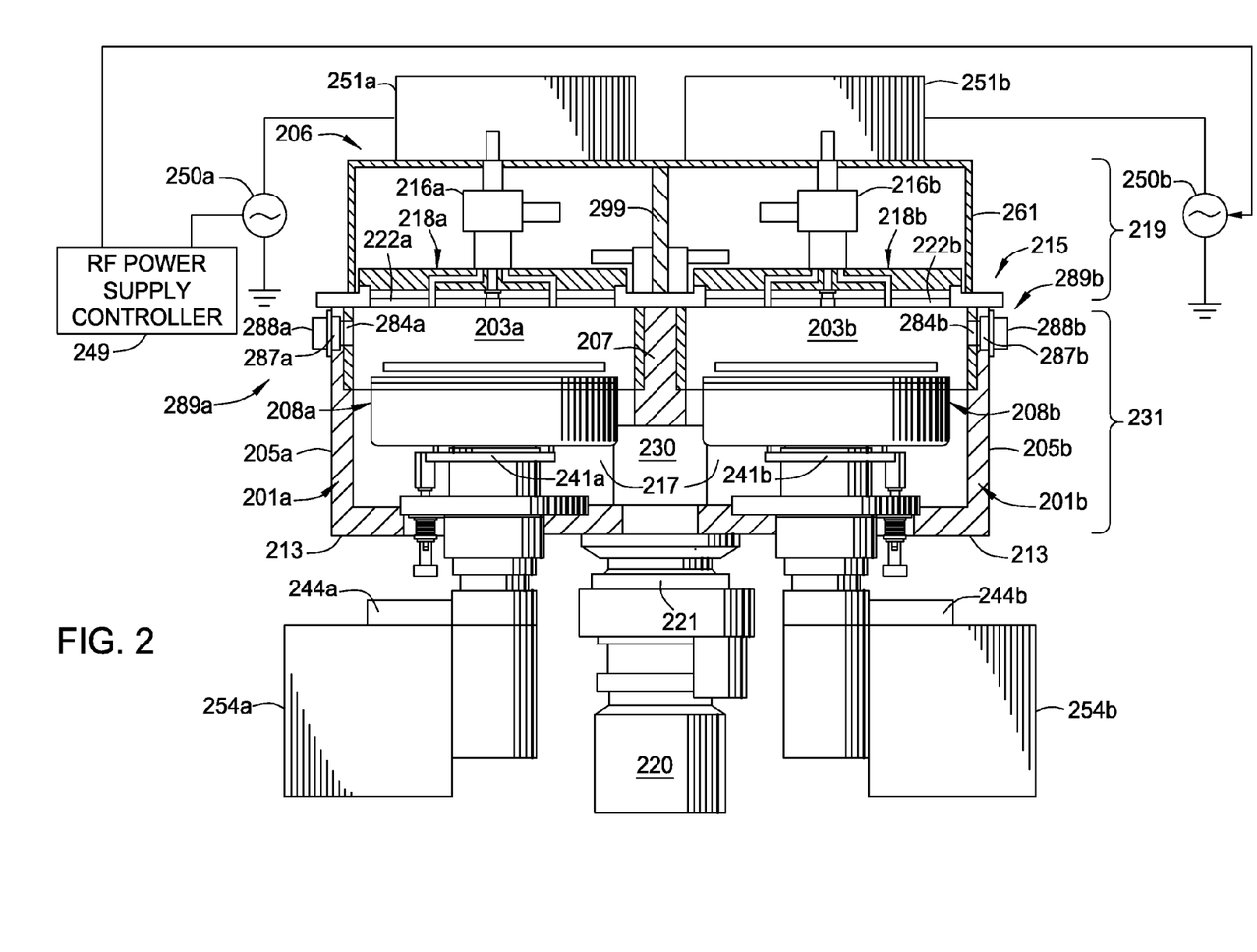
FIG. 2 is a sectional view of a first and second process chamber of a tandem processing chamber.

FIG. 2 illustrates a sectional view of the first and second process chambers of a tandem processing chamber 206. One tandem processing chamber 206 comprises two process chambers 201a, 201b. Each of the respective first and second process chambers 201a, 201b may include an upper and lower portion 219, 231, wherein the upper portion 219 generally includes upper electrode assemblies 218a, 218b and the lower portion 231 generally includes a loading region (not shown) to permit entry and exit of substrates into the respective process chambers 201a, 201b. Each of the respective first and second process chambers 201a, 201b include sidewalls 205a, 205b, interior wall 207, a bottom 213, and a lid 215 disposed thereon. Gas distributors 222a, 222b are disposed within process chambers 201a, 201b. The sidewall 205a, interior wall 207 and gas distributor 222a define a first processing region 203a. The sidewall 205b, interior wall 207 and gas distributor 222b define a second processing region 203b. The interior wall 207 is shared between the respective first and second process chambers 201a, 201b and isolates the processing environment of the processing regions 203a, 203b from contamination. However, in some embodiments, the processing regions 203a, 203b defined in the respective process chambers 201a, 201b, while remaining process isolated, may share a common pressure. For example, the lower portion of interior wall 207 may allow the respective first and second process chambers 201a, 201b to communicate with each other by way of central pumping plenum 217.

The lower portion of interior wall 207 is defined by a central pumping plenum 217. The lid 215 may include one configuration of gas distribution assemblies 216a, 216b including a showerhead 222a, 222b configured to dispense a gas into the respective processing regions 203a, 203b. The lid 215 is generally attached to the tandem processing chamber 206 using a hinge. Gas lines coupled to the lid 215 are configured to allow the lid 215 to open upon its hinges. The hinged lid 215 allows for convenient access to the chamber components. A cover 261 may be disposed on the lid 215 to protect components disposed thereon.

To provide process analysis, windows 287a, 287b may be disposed within each sidewall 205a, 205b and optically aligned with openings 284a, 284b disposed within the chamber liner. Each window 287a, 287b may be composed of any optically clear material adapted to withstand a process environment while providing an optical pathway for optical detectors 288a, 288b disposed adjacent each process chamber 201a, 201b. The optical detectors 288a, 288b may be configured to optically receive and process optical signals from within the respective processing regions 203a, 203b and provide data representative of chamber or substrate conditions to a process controller (not shown).

Optical windows 287a, 287b, optical detectors 288a, 288b, and a process controller collectively form process analysis systems 289a, 289b. During operation, optical signals may be processed by the process analysis systems 289a, 289b to detect etching conditions for each process chamber 201a, 201b. To detect an etching process endpoint, a process endpoint measurement may be stored, for example, and compared by the process controller to a current measurement. Once the process analysis systems 289a, 289b detect an optical signal from a process chamber 201a, 201b, the process controller may provide an endpoint indication to a user.

Process chambers 201a, 201b also include substrate supports 208a, 208b. When the substrate supports 208a, 208b are in a processing position, the upper portion 219 of process chambers 201a, 201b and substrate supports 208a, 208b generally define the respective isolated processing regions 203a, 203b. Therefore, in combination, the sidewalls 205a, 205b, interior wall 207, substrate supports 208a, 208b, and the lid 215 provide process isolation between the processing regions 203a, 203b.

The volume of the processing regions 203a, 203b may vary with the position of the substrate supports 208a, 208b relative to the lower boundary of the lid 215. In one configuration, substrates may be positioned on the substrate supports 208a, 208b through gate valve 110 (See FIG. 1). The substrates can be lifted off the substrate supports 208a, 208b with lift pins, and a robot blade may enter the processing regions 203a, 203b to engage the substrates for removal. Similarly, with the substrate supports 208a, 208b in a lowered positioned, substrates may be placed thereon for processing. Thereafter, the substrate supports 208a, 208b may be vertically moved into a processing position, e.g., a position where the upper surface of the substrate supports 208a, 208b are positioned proximate to the respective processing region 203a, 203b.

In one embodiment, the substrate supports 208a, 208b may comprise electrostatic chucks to provide a stable working position for a substrate supported thereon. First and second chuck power supplies 244a, 244b may be coupled to the electrostatic chucks, and may be used to produce an electrostatic field proximate to the electrostatic chucks to hold the substrates thereto. The first and second chuck power supplies 244a, 244b may be DC supplies configured to provide an electrostatic field between the electrostatic chucks and the substrates. To electrically bias plasma toward and away from the substrate supports 208a, 208b, a first electrical bias source 254a and second electrical bias source 254b may be coupled to the substrate supports 208a, 208b.

The lid 215 may have other plasma generation devices disposed adjacent thereto. In one embodiment, the upper electrode assemblies 218a, 218b may be configured with RF coils (not shown). The coils may be coupled to the first and second RF sources 250a, 250b through respective matching networks 251a, 251b, to inductively couple RF energy into the plasma processing regions 203a, 203b. The RF power supply controller 249 is coupled to RF power supplies 250a, 250b to provide output signal control including power level control, phase control (locking) and/or frequency control (locking).

The lower portion 231 of the respective first and second process chambers 201a, 201b may also include a commonly shared adjacent chamber region of each chamber defined by a central pumping plenum 217. The central pumping plenum 217 may be in fluid communication with a common vacuum source 220 through a pumping valve 221. Generally, the central pumping plenum 217 includes two sections defined by the sidewalls 205a, 205b that are combined with an output port 230 in fluid communication with the pumping valve 221. The two sections may be formed as part of the lower portion 231 of each process chamber 201a, 201b. While the central pumping plenum 217 may be formed integral to the lower portion 231 of the first and second process chambers 201a, 201b, it is contemplated that the central pumping plenum 217 may be a separate body coupled thereto. In a gas purge or vacuum process, the pumping valve 221 couples the vacuum source 220 to the output port 230. Therefore, the central pumping plenum 217 is generally configured to maintain the respective chambers 201a, 201b, and more particularly, the respective processing regions 203a, 203b, at a pressure desired for semiconductor processing while allow for rapid removal of waste gases using a single vacuum source 220.

In one configuration, the output port 230 is positioned a distance from the processing regions 203a, 203b such as to minimize RF energy therein, thereby minimizing striking a plasma in the exhaust gases being flushed from the processing chambers 201a, 201b. For example, the output port 230 may be positioned at a distance from the substrate supports 208a, 208b and processing regions 203a, 203b that is sufficiently far to minimize RF energy within the output port 230.

Figure 3:
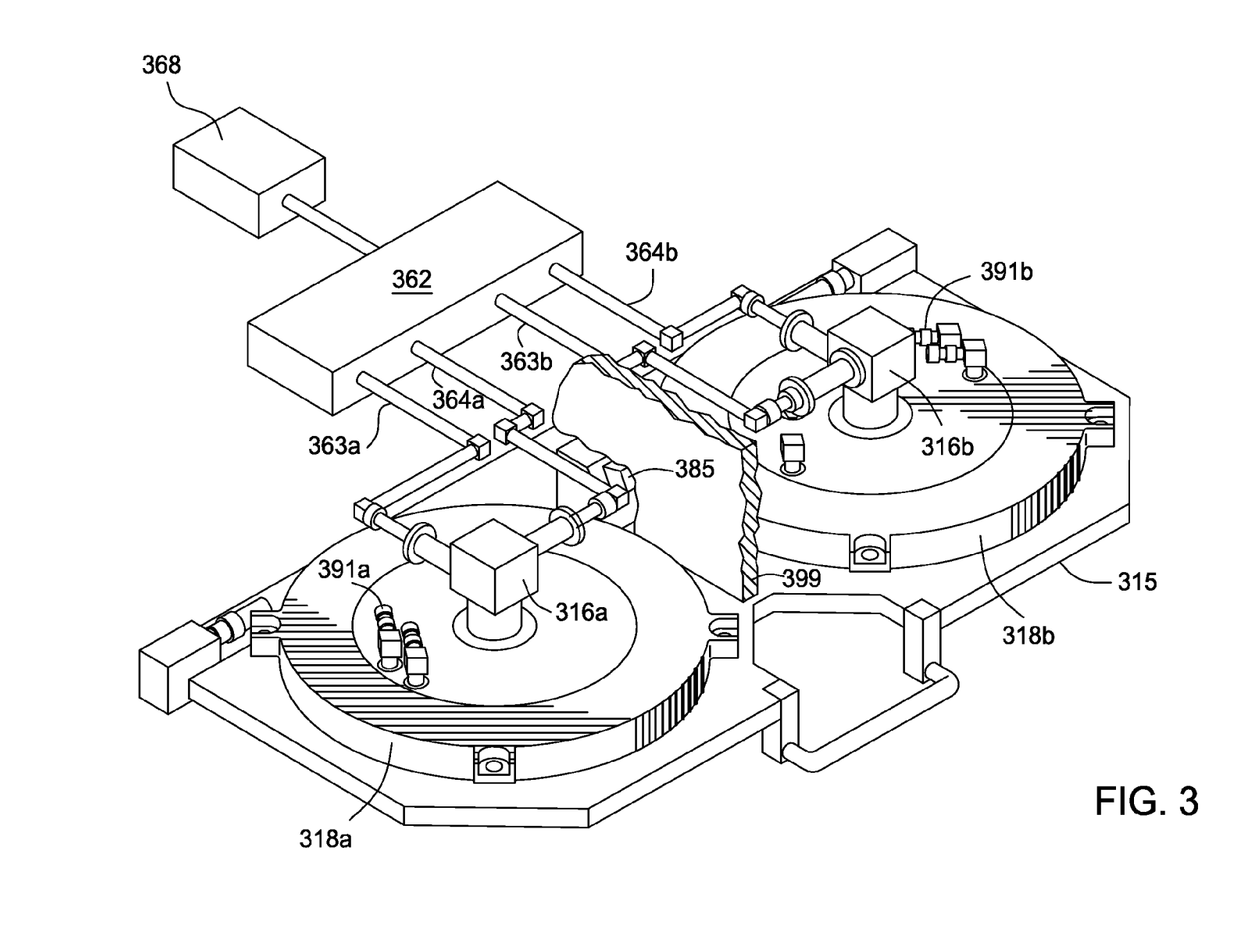
FIG. 3 is a perspective view of a lid of a first and second process chamber of a tandem processing chamber.

FIG. 3 is a perspective view of a lid 315 of first and second process chambers of a tandem processing chamber 206. The lid 315 includes upper electrode assemblies 318a, 318b. The lid 315 and/or first and second process chambers may include cooling passages (not shown) that circulate coolant received from an upper coolant input/output port 385. The upper electrode assemblies 318a, 318b are disposed adjacent the processing regions and adapted to provide RF energy to respective processing regions. To provide thermal control to the upper electrode assemblies 318a, 318b, cooling channels for the first and second upper electrode assemblies 318a, 318b may be coupled to an external coolant source (not shown) by a first and second coolant inputs 391a, 391b.

The upper electrode assemblies 318a, 318b may include an RF shield 399 mounted between the first and second upper electrode assemblies 318a, 318b to minimize RF leakage by isolating electromagnetic fields therebetween. The RF shield 399 may include materials adapted to absorb or reflect RF energy. For example, RF shield 399 may include metals such as steel and aluminum, and may also include electromagnetic insulating materials. The RF shield 399 may be configured to span the width of the lid 315 and may extend to the top of the cover of the apparatus. To provide additional RF isolation, the shield member 399 may include an RF gasket (not shown) disposed between the shield member 399 and the lid 315.

A gas flow measuring device such as a mass flow controller (MFC, not shown) is used in conjunction with a flow ratio controller to control the amount of gas flow to each processing region. Measured gas flow is provided to each processing region through the gas distribution assemblies 316a, 316b. In the embodiment of FIG. 3, the MFC and the gas flow ratio controllers are disposed within gas panel 362. It is contemplated, however, that the MFC and the flow ratio controllers may be disposed outside of the gas panel 362.

A process gas supply 368 is coupled to gas panel 362. Additional process gas supplies (not shown) may be coupled to gas panel 362. Gas panel 362 includes the MFC to regulate the amount of process gas supplied from process gas supply 368 to the process chambers through gas supply lines 363a, 363b, 364a, 364b. The MFC is disposed between process gas supply 368, and gas supply lines 363a, 363b, 364a, 364b. Gas supply lines 363a, 363b, 364a, 364b are in fluid communication with the MFC.

Gas supply lines 363a, 363b, 364a, 364b are configured to allow for opening and closing of chamber lid 315 upon its hinges. Gas supply lines 363a, 363b are coupled to an interior zone of the gas distributors while gas supply lines 364a, 364b are coupled to an outer zone of the gas distributors. Therefore, the apparatus of FIG. 3 allows a single process gas supply source 368 to be divided between each process chamber of a tandem processing chamber, as well as each zone of the gas distributors. This results in a single gas source being split and regulated four ways in the embodiment of FIG. 3. In other embodiments, a single gas supply source may be split and regulated in more than 4 ways, such as 6, 8, 10 or 12 different ways. Regardless of the number of gas line splits, embodiments herein allow for the regulation of the gas flow through the gas lines using a single MFC.

Figure 4:
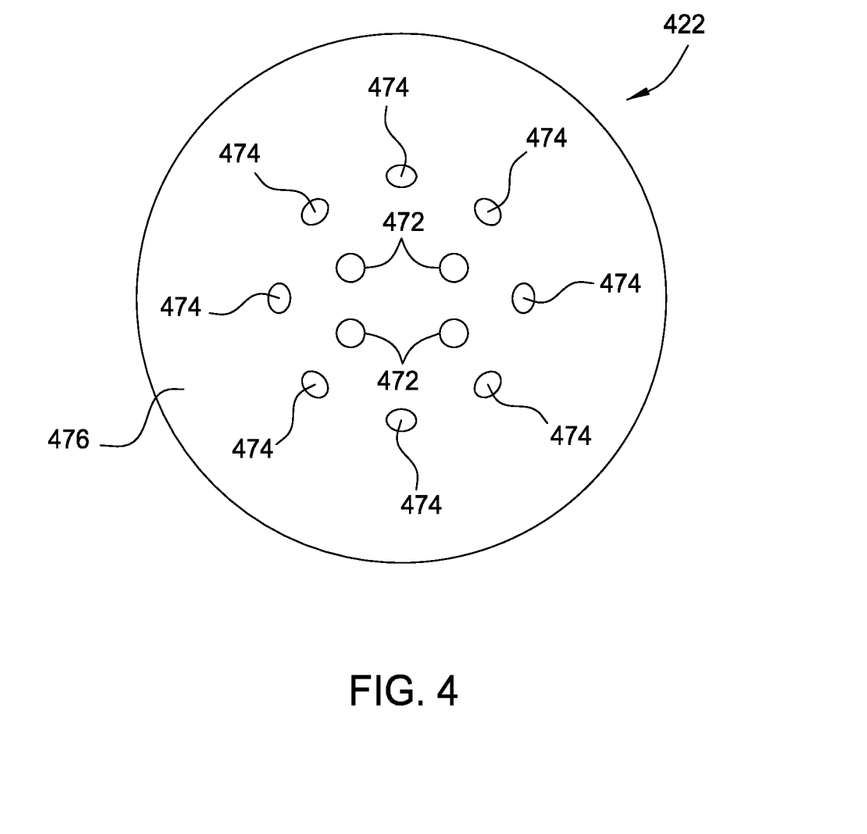
FIG. 4 is a bottom view of a gas distributor.

FIG. 4 shows a bottom view of the gas distributor 422 according to one embodiment. Gas distributor 422 is positioned centrally in the process chambers. Openings 472 are positioned centrally in the process chambers above the substrate support and substrate. Gas distributor 422 comprises a first zone centrally-located having holes 472, through which process gas is provided from the gas supply lines to the processing regions. Gas distributor 422 also comprises an outer zone disposed circumferentially around the central zone. The outer zone has holes 474 through which process gas is provided from the gas supply lines to processing regions. While the gas distributor of FIG. 4 depicts four holes in the central zone, and eight holes in the outer zone, gas distributor 422 can include any number of holes in each zone, depending on the application and the size of the substrates to be processed in the process chambers.

The multiple zones of gas distributor 422 allow for tuning of process gas flow with respect to the radial etching rate of a substrate. For example, if the center of a substrate is etched at a rate faster than the perimeter of the substrate, then process gas supplied through the central zone holes 472 may be reduced, or the amount of process gas supplied to the outer zone holes 474 may be increased. This allows for the etching rate across the substrate to become substantially equal, thus producing a more uniform substrate. Since different gas flows can be provided through the central and outer zones, it is important that the gas flows be accurately measured and regulated to ensure desired substrate processing.

Since a single gas supply could be split between two processing chambers (and further into two gas distribution zones per process chamber) it may be important to ensure that each process chamber receives substantially the same amount of process gas. When similar amounts of process gas are provided to the process chambers, the process chambers are able to process substrates under substantially similar operating conditions. Similar operating conditions among the process chambers allows for process uniformity among processed substrates. If a single gas supply line has any error in its flow rate to the chamber, process uniformity can be affected. Therefore, the error in flow rate needs to be corrected, and other gas supply lines should take into account any correction provided to adjacent gas lines.

One embodiment of the invention uses a MFC to calibrate the channels of a flow ratio controller (FRC), with each channel of the FRC coupled to a gas supply line. The FRC is responsible for regulating the amount of process supply gas disposed through the central zone and the outer zone of the gas distributors 422 disposed in each process chamber. The methods of the present invention allow for accurate gas flow control with a reduced number of mass flow controllers. For example, a MFC is not necessary for every channel of the FRC.

Figure 5:
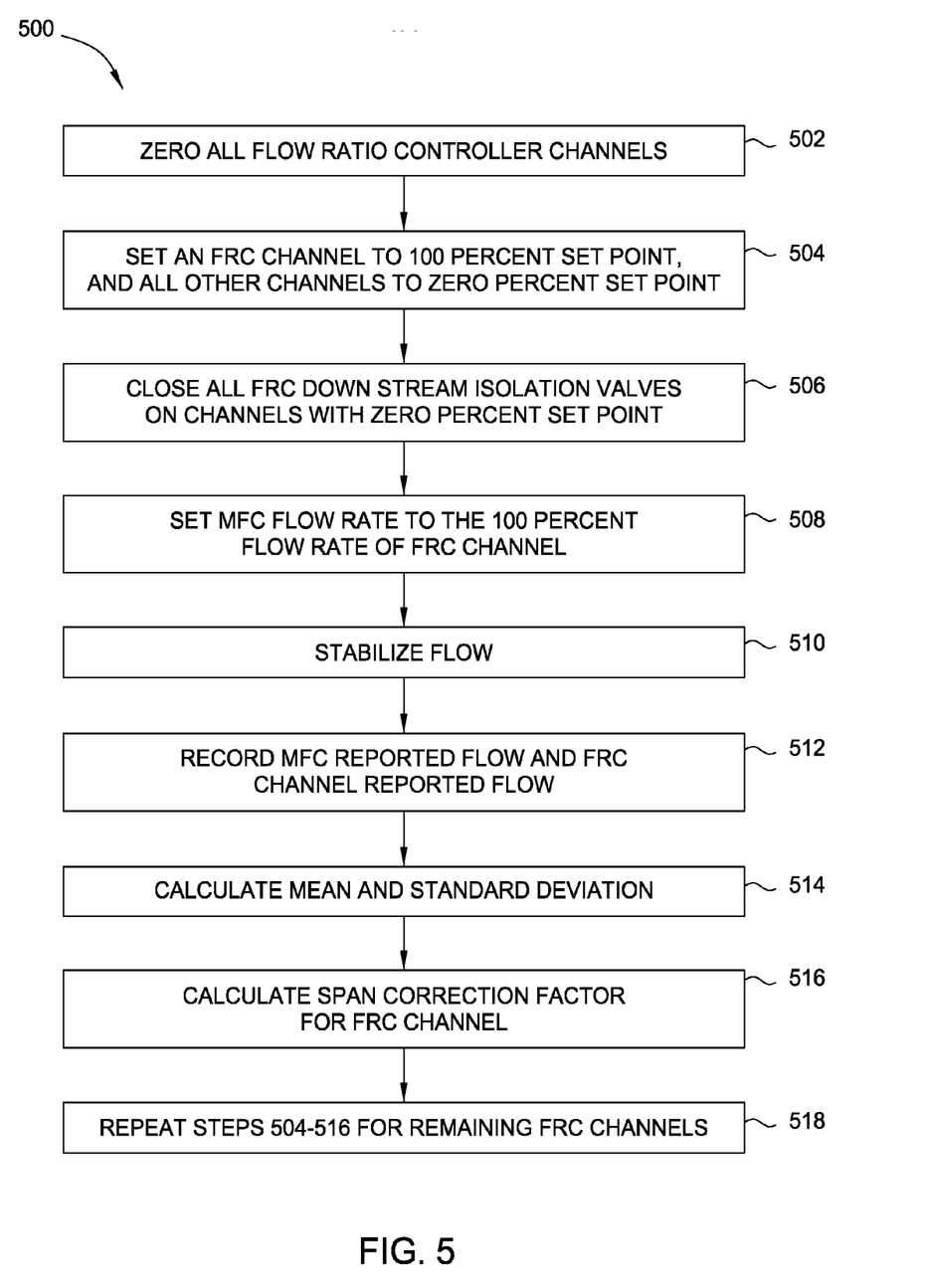
FIG. 5 is flow chart describing a method for determining a correction factor for a flow ratio controller channel.

FIG. 5 is flow chart 500 representing one embodiment of the invention. Flow chart 500 describes how to derive channel correction factors for flow rate errors with a reduced number of MFCs. Flow chart 500 begins at step 502. At step 502, all FRC channels are zeroed under vacuum. All FRC channels should be zeroed on a regular basis by requesting a zero service from the FRC device, subsequent to a manifold leak check. However, if recently zeroed, this step may be optional.

At step 504, one of the channels of the FRC is set to the 100 percent set point (e.g., channel full scale), and all other FRC channels are set to the zero percent set point. For example, channel 1 may be set to the 100 percent set point. The 100 percent set point is the set point allowing maximum gas passage through the FRC. At step 506, all downstream isolation valves on channels with a zero percent set point are closed. This allows for all the gas measured by the MFC to flow through and be measured by a single FRC channel, for example FRC channel 1. At step 508, The MFC is set to provide a gas flow corresponding to the 100 percent channel flow of the FRC. For example, if the FRC of channel 1 at 100 percent set point can flow 1000 SCCM of $N_2$ gas, then the MFC is also configured to flow 1000 SCCM of $N_2$ gas to channel 1. MFCs utilized in embodiments of the present invention can be configured to flow any amount of process gas as is required by a process recipe. For example, an MFC may be configured to flow a process gas within a range from about 100 SCCM to about 5000 SCCM of $N_2$ gas, such as about 500 SCCM to about 1500 SCCM, or about 800 SCCM to about 1200 SCCM. It is contemplated that MFCs adapted to flow greater or lesser amounts of process gas may be utilized.

At step 510, the gas flow through the MFC and the FRC is allowed to stabilize. For example, the gas is allowed to flow for at least about 50 seconds. At step 512, after the gas flow has stabilized, the MFC reported flow and FRC reported flow are recorded over about a 10 second interval, with a minimum of 10 evenly-spaced samples being taken. For example, 25, 50, or 100 samples may be taken. At step 514, the mean and standard deviation between the MFC flow and FRC flow can be calculated for each of the evenly-spaced samples. If the standard deviation is greater than about 0.5 percent, this indicatives that the flow was not stabilized, and step 510 may need to be repeated. If step 510 needs to be repeated about three times, this could signal an issue with the MFC or FRC, which may require additional troubleshooting or replacement of the MFC or FRC.

At step 516, span correction factors are calculated using the mean flow value calculated at step 514 (See Equation 1). At step 518, steps 504 through 516 are performed for the remaining FRC channels (e.g., those coupled to the remaining gas supply lines).

Referring back to step 516, the span correction factors can be calculated in the following manner. The span correction factor ($CF_i$) is defined by the following equation:

$$CFi = \frac{\text{Single Channel } (i) \text{ Actual Flow}}{\text{Single Channel } (i) \text{ Reading}} \quad \text{(Equation 1)}$$

The span correction factor ($CF_i$) accounts for span error. The Single Channel Actual Flow represents the MFC flow in SCCM from step 508 above, and the Single Channel Reading represents the mean FRC flow from step 514 for the respective channel i. The span correction factor $CF_i$ accounts for the difference in actual flow rate of channel and the measured flow rate. However, since a single gas supply is being split into multiple channels, all channels must take into account the correction factors of other channels.

Using the span correction factors from Equation 1 (the single channel correction factor), the corrected set points for the FRCs can be derived using Equation 2, which is the set point for each channel of the FRC, taking into account correction factors applied to other channels of the FRC.

$$cSP_i = \frac{SP_i}{CF_i} * \left( \sum_i^n \frac{SP_i}{CF_i} \right)^{-1} \quad \text{(Equation 2)}$$

The corrected set points are calculated from an "m×m" system of linear equations (m number of rows by m number of columns), where m=n+1, and n=the number of channels of the FRC coupling gas supply lines to the process chambers 201a, 201b (See FIG. 2). In the embodiment of FIG. 3, n=4, representing gas supply lines 363a, 363b, 364a, 364b. For Equation 2, $cSP_i$ is the calculated corrected set point of respective channel i, $SP_i$ is the set point for channel i, and $CF_i$ is the span correction factor for channel i, calculated from Equation 1.

The span correction factor ($CF_i$) provides for correction between the actual flow of the MFC, and the set point of the FRC through a single channel. The calculated corrected set point ($cSP_i$) accounts for the summation of the span corrections, taking into account the span correction factor of adjacent FRCs. The $cSP_i$ provides the set point at which the FRC should be set to deliver the desired amount of process gas to the chamber, accounting for deviation of the respective channel as well as adjacent channels of the FRC. Since one process gas supply is divided among four gas lines through four channels of an FRC (in FIG. 3 for example), any correction necessary at one FRC channel may require correction at another channel as well. As discussed above, it may be important that all process chambers receive the same amount of process gas to ensure substrate throughput uniformity. Thus, if a first channel of the FRC requires a span correction factor ($CF_i$), then other channels must take into the first channel's correction factor also. This ensures equal process gas distribution between process chambers. Equation 2 adequately accounts for all channel correction factors when deriving the corrected set point for each respective channel, using a reduced number of MFCs.

One skilled in the art can appreciate that the above equations can be applied to etch chambers using any number of process gas lines and FRC channels. A brief discussion of how FRCs operate will allow this to become more clear. At any point in time during the FRC operation, the FRC control algorithm reads the total incoming flow as the sum of measured flow rate by each of its channels "QinRd". It is noted that each FRC may have any number of incoming and outgoing flows, however, for purposes of clarity, embodiments herein will be discussed with reference to a FRC with a single incoming flow and four outgoing channels.

Regarding QinRd, this total flow reading is used to determine the desired flow set point for a channel by multiplying QinRd with the percent-set point for the respective channel. Due to span errors, QinRd is not constant, even while the actual incoming flow is constant. In steady state, QinRd is a function of the set point for each channel.

QinRd is defined as follows:

$$QinRD = QinActual * \left( \sum_i^n (SP_i * CF_i) \right)^{-1} \quad \text{(Equation 3)}$$

$SP_i$ is the set point for channel i, $CF_i$ is span correction factor for channel i, QinRd is the total incoming flow reading as function of $SP_i$ for all channels of the FRC, and QinActual is the actual total incoming flow. By rearranging Equation 3, we can arrive at Equation 4, which is the actual flow per channel.

$$QinActual(i) = QinRD * SP_i * CF_i \quad \text{(Equation 4)}$$

Furthermore, the desired actual flow for a channel is equal to the set point multiplied by the total incoming actual flow. To achieve balanced flow, the total incoming flow as measured by the sum of all FRC channels, multiplied by the corrected set point and the span correction factor must equal the actual flow for a channel. Thus, Equation 5 holds true for every set point.

$$cSP_i * QinRD_c * CF_i = SP_i * QinActual \quad \text{(Equation 5)}$$

For Equation 5, $Sp_i$ is the set point for channel i (in percentage flow), $cSP_i$ is the corrected set point for channel i (in percentage flow) derived from Equation 2 above, QinRdc is the total incoming flow reading as a function of $cSP_i$ for all channels of the FRC, QinActual is the actual total incoming flow, and $CF_i$ is span correction factor derived from Equation 1. QinRdc is an unknown variable in Equation 5, and is a function of the span errors and corrected set points of all channels of the FRC for a particular actual flow. To solve the above equation, and additional equation is required. Since the sum of all set points is always 100%, Equation 6 is true.

$$\sum_{i}^{n} cSP_i = 100\% \quad \text{(Equation 6)}$$

The corrected set point is calculated from an "m×m" system of linear equations, where m=n+1, and n=the number of channels of the FRC having gas lines coupled to the process chambers. Equation 7 represents one example of an "m×m" matrix for a four-channel FRC. The columns represent $cSP_1$, $cSP_2$, $cSP_3$, $cSP_4$, and QinRd, respectively. Solving the matrix yields one solution for each of the 5 unknowns, and derives Equation 2, above, which can be used to calculate the corrected set point for each channel of an n-channel FRC.

$$\left\{ \begin{matrix} CF_1 & 0 & 0 & 0 & SP_1 * QinActual \\ 0 & CF_2 & 0 & 0 & SP_2 * QinActual \\ 0 & 0 & CF_3 & 0 & SP_3 * QinActual \\ 0 & 0 & 0 & CF_4 & SP_4 * QinActual \\ 1 & 1 & 1 & 1 & 0 \end{matrix} \middle| \begin{matrix} 0 \\ 0 \\ 0 \\ 0 \\ 1 \end{matrix} \right\} \quad \text{(Equation 7)}$$

To verify the results of Equation 2, one can determine the total incoming flow as read by all channels of the FRC (e.g., QinRdc) with Equation 8.

$$QinRd_c = QinActual \bigg/ \left( \sum_{i}^{n} cSP_i * CF_i \right) \quad \text{(Equation 8)}$$

Equation 8 can be rearranged to form Equation 9, which yields an expression for the actual incoming flow. The calculated sum of the all actual flows for all channels as calculated by Equation 2 must equal the actual flow of the MFC (Equation 8).

$$QinActual = QinRd_c * \left( \sum_{i}^{n} cSP_i * CF_i \right) \quad \text{(Equation 9)}$$

Table 1 shows a calculation example for a corrected set point calculation and verification of the result for a 4-channel FRC. The single channel actual flow and the single channel reading can be used to determine the span correction factor using Equation 1. In the bottom section of Table 1, "setpoint %" corresponds to the desired percentage of gas flow of the respective channel. However, due to the difference in actual flow of the channel versus the single channel reading of the respective channel, the flow rate is inaccurate. The span correction factor derived using Equation 1 provides a method for determining a corrected set point for each channel using Equation 2. As can be seen below, the corrected set point can vary widely from the initial set point.

Embodiments described above allow a processing system user to accurately program gas flow set points, which improves process uniformity in separate chambers and increases substrate throughput. Additionally, embodiments described above provide a method for tuning process gas flow using a reduced number of MFCs, which reduces the overall cost of the processing system.

TABLE 1

| FRC Span Verification | ch1 | ch2 | ch3 | ch4 | Total |
|---|---|---|---|---|---|
| Single Channel Actual Flow (SCCM) | 100 | 98 | 100 | 100 | 398 |
| Single Channel Reading (SCCM) | 110 | 67 | 180 | 112 | 469 |
| Reading Error | 10 | −31 | 80 | 12 | 71 |
| Span Slope | 1.100000 | 0.683673 | 1.800000 | 1.120000 | |
| Span Correction Factor | 0.909091 | 1.46269 | 0.55556 | 0.89286 | |
| Calculation of Corrected Set Point | ch1 | ch2 | ch3 | ch4 | Total |
| Set Point Percent | 10.00% | 40.00% | 10.00% | 40.00% | 100.00% |
| SPi/CFi | 0.11 | 0.27 | 0.18 | 0.45 | 1.01 |
| Corrected Set Point | 10.88% | 27.04% | 17.80% | 44.29% | 10.00% |
| Channel Actual Flow (SCCM) | 30.00 | 120.00 | 30.00 | 120.00 | 300.00 |
| Channel Reading (SCCM) | 33.00 | 82.04 | 54.00 | 134.00 | 303.44 |

As can be seen in Table 1, the FRC actual flow as measured by the MFC for channel 1 was 100 SCCM of N$_2$ gas. However, the FRC read the incoming flow for channel 1 as 110 SCCM of N$_2$ gas, which resulted in an error of 10 SCCM of N$_2$ gas through channel 1. Using Equation 1, a span correction factor of 0.909091 was derived. The FRC actual flow as measured by the MFC for channel 2 was 98 SCCM of N$_2$ gas. The FRC read the incoming flow for channel 2 as 67 SCCM of N$_2$ gas, which resulted in an error of 31 SCCM of N$_2$ gas through channel 2. Using Equation 1, a span correction factor of 1.46269 was derived.

The FRC actual flow as measured by the MFC for channel 3 was 100 SCCM of N$_2$ gas. The FRC read the incoming flow for channel 3 as 180 SCCM of N$_2$ gas, which resulted in an error of 80 SCCM of N$_2$ gas through channel 3. Using Equation 1, a span correction factor of 0.55556 was derived. The FRC actual flow as measured by the MFC for channel 4 was 100 SCCM of N$_2$ gas. The FRC read the incoming flow for channel 4 as 112 SCCM of N$_2$ gas, which resulted in an error of 12 SCCM of N$_2$ gas through channel 4. Using Equation 1, a span correction factor of 0.89286 was derived. The total flow through all four channels combined was 398 SCCM of N$_2$ gas, although the FRC was reading a flow rate of 469 SCCM of N$_2$ gas. This results in an error of 71 SCCM of N$_2$ gas.

In the second part of Table 1, QinActual is equal to 300 SCCM of N$_2$ gas, and QinRd is 303.44 SCCM of N$_2$ gas. In Table 1, corrected set points are determined for channels 1 through 4 of the FRC. Channel 1 set point is initially desired to be 10 percent of QinActual (300 SCCM of N$_2$ gas). However, because channel 1 is reading 110 SCCM of N$_2$ gas when it is only flowing 100 SCCM of N$_2$, channel 1 would need to read 33 SCCM of N$_2$ gas to flow 30 SCCM of N$_2$ gas, e.g., the set point would need to be different than the desired flow rate. Channel 2 is desired to be set at 40 percent of QinActual, but since it is flowing 98 SCCM of N$_2$ gas when it is reading 67 SCCM of N$_2$ gas, the set point for channel 2 must be corrected also. Similarly, since the actual flows for channels 3 and 4 differ from the readings of channels 3 and 4, the set points will also produce different gas flows than desired. Therefore, it is necessary to use Equation 2 to calculate the corrected set points based from the span correction factors for each channel.

The corrected set points for channel 1 through channel 4 (10.88 percent, 27.04 percent, 17.80 percent, and 44.29 percent, respectively) indicate the set points the FRC channels should be set at to correct the difference in actual versus read flow rate for all the channels. Once corrected, the actual flow rates through the channels will be equal to the desired flow rates. In Table 1, the desired flow rates of channels 1 through channels four are 10 percent, 40 percent, 10 percent, and 40 percent of 300 SCCM of N$_2$ gas, respectively.

Furthermore, one channel cannot simply be corrected without taking into account the remaining channels. Since QinActual remains nearly constant, the change in flow rate of a single isolated channel would cause the corrected difference in the flow rate to be provided to the other channels. However, Equation 2 accurately takes into account the change in flow rate of all channels, and reduces the overall error of the flow rate (QinActual versus QinRd) to about 1 percent in the example of Table 1. In the upper half of Table 1, prior to using the corrected set points, the overall flow rate had an error of 71 SCCM of N$_2$ gas (approximately 24 percent). While using the corrected set points, the overall flow rate had only an error of about 3 SCCM of N$_2$ gas (approximately 1%).

Table 1 is derived using diatomic nitrogen (N$_2$) as the process gas. Consequently, the FRCs were also calibrated assuming diatomic nitrogen as the process gas. If another process gas were used, normally the FRCs would need to be recalibrated to account for the new process gas. However, by implementing an additional set of correction factors, termed gas-independent precision correction factors, multiple process gasses can be regulated by a single FRC without recalibration. The gas-independent precision correction factors allow the FRC to operate in a gas-independent manner.

The use of gas-independent precision correction factors builds upon the process described above. As described above, the FRC is calibrated using a MFC as a reference. The FRC is zeroed, and a previously verified MFC (preferably with N$_2$) is used. Subsequent to zeroing, each FRC channel is verified individually using the MFC as a reference, while the remaining channels are closed using isolation valves. The resulting FRC readings are used to calculate corrected set points based on the measured span error of each channel (See Equations 1 and 2).

Having derived the span correction factors (CF$_i$), gas-independent precision correction factors can now be derived, making the FRC gas-independent. Equation 10 represents the calculation of gas-independent precision correction factors for a 4-channel device, such as that shown in the embodiment of FIG. 3.

$$PCF_1 = \frac{4}{1 + \frac{1}{CF_1}(CF_2 + CF_3 + CF_4)} \quad \text{(Equation 10)}$$

$$PCF_2 = \frac{4}{1 + \frac{1}{CF_2}(CF_1 + CF_3 + CF_4)}$$

$$PCF_3 = \frac{4}{1 + \frac{1}{CF_3}(CF_1 + CF_2 + CF_4)}$$

$$PCF_4 = \frac{4}{1 + \frac{1}{CF_4}(CF_1 + CF_2 + CF_3)}$$

Equation 10 allows the span correction factors (CF$_i$) to be normalized. After calculating the gas-independent precision correction factors (PCF$_i$) using Equation 10, it may be necessary for the host to store these values in a table, and these values may need to be accessible every time a new set point is set on the FRC, e.g., a user-input command for change in process conditions. Using the gas-independent precision correction factors (PCF$_i$), the corrected set points can be recalculated by substituting the gas-independent precision correction factors (PCF$_i$) derived from Equation 10 for the span correction factors (CF$_i$) of Equation 2, thus becoming gas-independent. The result yields Equation 11.

$$cSP_i = \frac{SP_i}{PCF_i} * \left(\sum_i^n \frac{SP_i}{PCF_i}\right)^{-1} \quad \text{(Equation 11)}$$

In Equation 11, cSP$_i$ represents the corrected set point for channel i, SP$_i$ represents the set point for channel i, and PCF$_i$ represents the gas-independent precision correction factor for channel i, as calculated from Equation 10.

The derivation of gas-independent precision correction factors (PCF$_i$) also simplifies diagnostics and monitoring of the FRC. Specifically, the gas-independent precision correction factors (PCF$_i$) also allow the span drift of channel i to be monitored, even when different process gases are used. The span drift of channel i is the change of the gas-independent precision span correction factors ($PCF_i$) of a channel of the FRC over time. Thus, the span drift is indicative of the FRC's ability to maintain a constant flow rate therethrough over time. The span drift is presented per unit time, thus allowing a user to form a recalibration or replacement schedule for the FRC. Since the span drift is determined using the gas-independent precision span correction factors ($PCF_i$), span drift can be monitored even when the FRC is used to regulate the flow of multiple process gases for different processes. It should be apparent to one skilled in the art that it is not necessary to control and regulate gas flow rates using the gas-independent precision correction factors ($PCF_i$), but instead a process can be controlled using use the span correction factors ($CF_i$). However, the use of the gas-independent precision span correction factors ($PCF_i$) provides for gas-independent monitoring and regulation.

Table 2 shows the resulting flow imbalances for uncorrected set points, as well as variations in QinRd based on set point. In one example of Table 2, the total uncorrected flow balance can be off from the desired flow balance by over 8 percent. In another example of Table 2, even though total flow balance is off less than one-tenth of a percent, individual channel flow rates may be off by more than 40 percent. Therefore, it is apparent that there is a need to correct errors in flow rate, preferably using a reduced amount of hardware.

As can be seen in Table 2, the FRC actual flow as measured by the MFC for channel 1 was 100 SCCM of $N_2$ gas. However, the FRC read the incoming flow for channel 1 as 110 SCCM of $N_2$ gas, which resulted in an error of 10 SCCM of $N_2$ gas through channel 1, and a span correction factor of 0.909091. The FRC actual flow as measured by the MFC for channel 2 was 98 SCCM of $N_2$ gas. The FRC read the incoming flow for channel 2 as 67 SCCM of $N_2$ gas, which resulted in an error of 31 SCCM of $N_2$ gas through channel 2, generating a span correction factor of 0.89286 using Equation 1.

The FRC actual flow as measured by the MFC for channel 3 was 100 SCCM of $N_2$ gas. The FRC read the incoming flow for channel 3 as 180 SCCM of $N_2$ gas, which resulted in an error of 80 SCCM of $N_2$ and a span correction factor of 0.55556. The FRC actual flow as measured by the MFC for channel 4 was 100 SCCM of $N_2$ gas. The FRC read the incoming flow for channel 4 as 112 SCCM of $N_2$ gas, which resulted in an error of 12 SCCM of $N_2$ gas and a span correction factor of 0.909091. The total flow through all four channels combined was 398 SCCM of $N_2$ gas, although the FRC was reading a flow rate of 469 SCCM of $N_2$ gas. This results in an error of 71 SCCM of $N_2$ gas.

The second and third parts of Table 2 emphasize the importance of checking span correction factors, and calculating corrected set points. In the second part of Table 2, channels 1 through 4 are set at 20 percent, 30 percent, 20 percent, and 30 percent, respectively. The total incoming actual flow (QinActual) is 300 SCCM of $N_2$ gas, while the flow rate read by the FRC channels is (QinRd) is 300.1 SCCM of $N_2$ gas. Low errors in QinActual versus QinRd can occur in a number of circumstances. For example, when set points have previously been calculated for this process, when set points have been calculated for a similar process, or when the flow rates are coincidentally equal. However, the third part of Table 2 exemplifies the error in channel flow rate that can occur if corrected set points are not determined. Even though QinActual and QinRd were approximately equal in part 2 of Table 2, QinActual and QinRd have a relatively large error upon changing the set points of the individual channels, as in part 3 of Table 2.

In part 3 of Table 2, the set points for channels 1 through 4 are changed to 10 percent, 40 percent, 10 percent, and 40 percent, respectively. Even though it appears from the second part of Table 2 that the Single Channel Actual Flow and the Single Channel Reading are approximately equal when looking at the overall gas flow (since QinActual and QinRd are approximately equal), Part 3 shows this is not true. By changing the set points of channels 1 through 4 in Part 3, QinActual and QinRd vary by about 8 percent, indicating the need to employ corrected set points for channels 1 through 4.

If a process user relied solely on the QinActual and QinRd of the second part of Table 2, the process user may be lead to believe that the FRCs are accurate, because the overall flow rate is accurate. However, if the process user did not verify single channel span errors or correction factors, then any process recipe that deviated from that of part 2 of Table 2 would not be accurate. These inaccuracies can create non-uniformity amongst processed substrates, or my lead to unusable substrates. Therefore, it is important that all channels of the FRC be calibrated, and any errors be accounted for through the use of corrected set points.

TABLE 2

| FRC Span Verification | ch1 | ch2 | ch3 | ch4 | Total |
|---|---|---|---|---|---|
| Single Channel Actual Flow (SCCM) | 100 | 98 | 100 | 100 | 398 |
| Single Channel Reading (SCCM) | 110 | 67 | 180 | 112 | 469 |
| Reading Error | 10 | −31 | 80 | 12 | 71 |
| Span Slope | 1.100000 | 0.683673 | 1.800000 | 1.120000 | |
| Span Correction Factor | 0.909091 | 1.46269 | 0.55556 | 0.89286 | |
| Calculated Uncorrected Controlled Flow | ch1 | ch2 | ch3 | ch4 | Total |
| Set Point Percent | 20.00% | 30.00% | 20.00% | 30.00% | 100.00% |
| Channel Actual Flow (SCCM) | 54.6 | 131.7 | 33.3 | 80.4 | 300 |
| Channel Reading (SCCM) | 60.0 | 90.0 | 60.0 | 90.0 | 300.1 |
| Calculated Uncorrected Controlled Flow | ch1 | ch2 | ch3 | ch4 | Total |
| Set Point Percent | 10.00% | 40.00% | 10.00% | 40.00% | 100.00% |
| Channel Actual Flow (SCCM) | 25.1 | 161.2 | 15.3 | 98.4 | 300 |
| Channel Reading (SCCM) | 27.6 | 110.2 | 27.6 | 110.2 | 275.6 |

Although embodiments herein generally refer to the regulation and monitoring of nitrogen ($N_2$) gas, it is contemplated that the flow of any process may be controlled using the methods described herein.

Benefits of the present invention include the ability to measure and account for differences between the actual gas flow and the measured gas flow during substrate processing. Thus, a dual tandem processing chamber may be used to increase substrate throughput and process uniformity at a reduced cost compared to a single substrate processing chamber.

While the foregoing is directed to embodiments of the present invention, other and further embodiments of the invention may be devised without departing from the basic scope thereof, and the scope thereof is determined by the claims that follow.

We claim:

1. A method of calibrating a flow ratio controller for a tandem chamber having two process chambers and a mass flow controller, each process chamber having a gas diffuser comprising multiple gas zones disposed therein, each gas zone of each gas diffuser coupled to the same process gas supply, comprising:
   a) setting all channels of a flow ratio controller coupled to the process gas supply to a set point allowing a maximum gas passage;
   b) opening a downstream isolation valve of a first channel of the flow ratio controller;
   c) closing all downstream isolation valves for all remaining channels of the flow ratio controller;
   d) setting flow of the mass flow controller equal to a full scale flow of the first channel of the flow ratio controller;
   e) stabilizing flow of a process gas through the flow ratio controller;
   f) calculating a span correction factor for the flow of the process gas through the first channel of the flow ratio controller;
   g) repeating steps (b)-(f) for all other channels and calculating a span correction factor for flow of the process gas through the remaining channels of the flow ratio controller; and
   h) determining a corrected set point for each channel of the flow ratio controller.

2. The method of claim 1, wherein the corrected set point of each channel is determined using the equation:

$$cSP_i = \frac{SP_i}{CF_i} * \left( \sum_i^n \frac{SP_i}{CF_i} \right)^{-1},$$

where $cSP_i$ is the corrected set point of each channel, $SP_i$ is an initial set point for each channel; and $CF_i$ is the span correction factor for each channel.

3. The method of claim 1, further comprising recording a reported flow of the process gas through the mass flow controller and the flow ratio controller.

4. The method of claim 2, further comprising zeroing the flow ratio controller.

5. The method of claim 4, wherein the process gas supply comprises a nitrogen gas supply.

6. The method of claim 4, wherein the flow ratio controller comprises at least four channels.

7. The method of claim 4, wherein the stabilizing the flow comprises flowing the process gas through the flow ratio controller for at least about 50 seconds.

8. The method of claim 7, wherein calculating a span correction factor comprises determining a mean flow rate of the process gas through the flow ratio controller based upon at least 10 evenly time-spaced samples.

9. The method of claim 2, further comprising applying a precision correction factor to make the flow ratio controller gas-independent, wherein the precision correction factors are used to determine the corrected set points with the following equation:

$$cSP_i = \frac{SP_i}{PCF_i} * \left( \sum_i^n \frac{SP_i}{PCF_i} \right)^{-1},$$

where $cSP_i$ is the corrected set point for each channel, $SP_i$ is the initial set point for each channel, and $PCF_i$ is the precision span correction factor.

10. The method of claim 9, wherein the flow ratio controller comprises at least four channels.

11. A method of calibrating a flow ratio controller for a tandem chamber having two process chambers and a mass flow controller, each process chamber having a gas diffuser comprising multiple gas zones disposed therein, each gas zone of each gas diffuser coupled to one process gas supply, comprising:
   a) setting a first channel of the flow ratio controller coupled to the process gas supply to a set point allowing a maximum gas passage;
   b) setting all remaining channels of the flow ratio controller to a zero percent set point;
   c) closing all downstream isolation valves for the remaining channels of the flow ratio controller that are set at the zero percent set point;
   d) setting flow of the mass flow controller equal to the flow of the first channel of the flow ratio controller;
   e) stabilizing flow of a process gas through the flow ratio controller;
   f) calculating a span correction factor for the flow of the process gas through the first channel of the flow ratio controller;
   g) calculating a span correction factor for flow of the process gas through the remaining channels of the flow ratio controller, comprising individually setting the flow ratio controller for each remaining channel to the set point allowing the maximum gas passage and repeating elements (b)-(f) for each of the remaining channels; and
   h) determining a corrected set point for each channel of the flow ratio controller.

12. The method of claim 11, wherein element (e) further comprises measuring the flow of the process gas through the first channel by determining a mean flow rate of the process gas through the first channel based on the at least 10 evenly-spaced samples.

13. The method of claim 11, further comprising zeroing the flow ratio controller.

14. The method of claim 11, further recalculating the corrected set points for each channel of the flow ratio controller using the equation:

$$cSP_i = \frac{SP_i}{PCF_i} * \left( \sum_i^n \frac{SP_i}{PCF_i} \right)^{-1},$$

where $cSP_i$ is the corrected set point for each channel, $SP_i$ is the initial set point for each channel, and $PCF_i$ is a precision span correction factor.

15. The method of claim 14, wherein the flow ratio controller comprises at least four channels.

16. The method of claim 14, wherein the stabilizing the flow comprises flowing the process gas through the flow ratio controller for at least about 50 seconds.

17. The method of claim 14, further comprising applying a precision correction factor to make the flow ratio controller gas-independent, wherein the precision correction factors are used to determine the corrected set points with the following equation:

$$cSP_i = \frac{SP_i}{PCF_i} * \left(\sum_i^n \frac{SP_i}{PCF_i}\right)^{-1},$$

where $cSP_i$ is the corrected set point for each channel, $SP_i$ is the initial set point for each channel, and $PCF_i$ is the precision span correction factor.

* * * * *